United States Patent [19]

Nogle et al.

[11] Patent Number: 4,949,752
[45] Date of Patent: Aug. 21, 1990

[54] THERMALLY COMPENSATED NOISE CONTROL DEVICE FOR A SOLENOID-ACTUATED VALVE

[75] Inventors: Thomas D. Nogle, Troy; Roy S. Nassar, Canton, both of Mich.

[73] Assignee: Chrysler Corporation, Highland Park, Mich.

[21] Appl. No.: 351,352

[22] Filed: May 12, 1989

[51] Int. Cl.$^5$ .............................................. F15B 13/44
[52] U.S. Cl. ............................... 137/596.17; 137/468; 137/625.65; 251/51; 251/129.16; 251/129.2
[58] Field of Search .............. 137/468, 596.17, 625.65; 251/51, 129.16, 129.2

[56] References Cited

U.S. PATENT DOCUMENTS 4,338,966  7/1982  Smith ........................... 137/596.17

FOREIGN PATENT DOCUMENTS 139369  8/1986  Japan ........................... 137/625.65

Primary Examiner—Gerald A. Michalsky
Attorney, Agent, or Firm—Mark P. Calcaterra

[57] ABSTRACT

The present invention is a thermally compensated noise control device for a solenoid-actuated valve. The device includes a thermally expanding ring which varies the amount of clearance between a damper assembly and a passageway in which the damper assembly is disposed to control fluid flow past the damper assembly.

20 Claims, 1 Drawing Sheet

U.S. Patent  Aug. 21, 1990  4,949,752
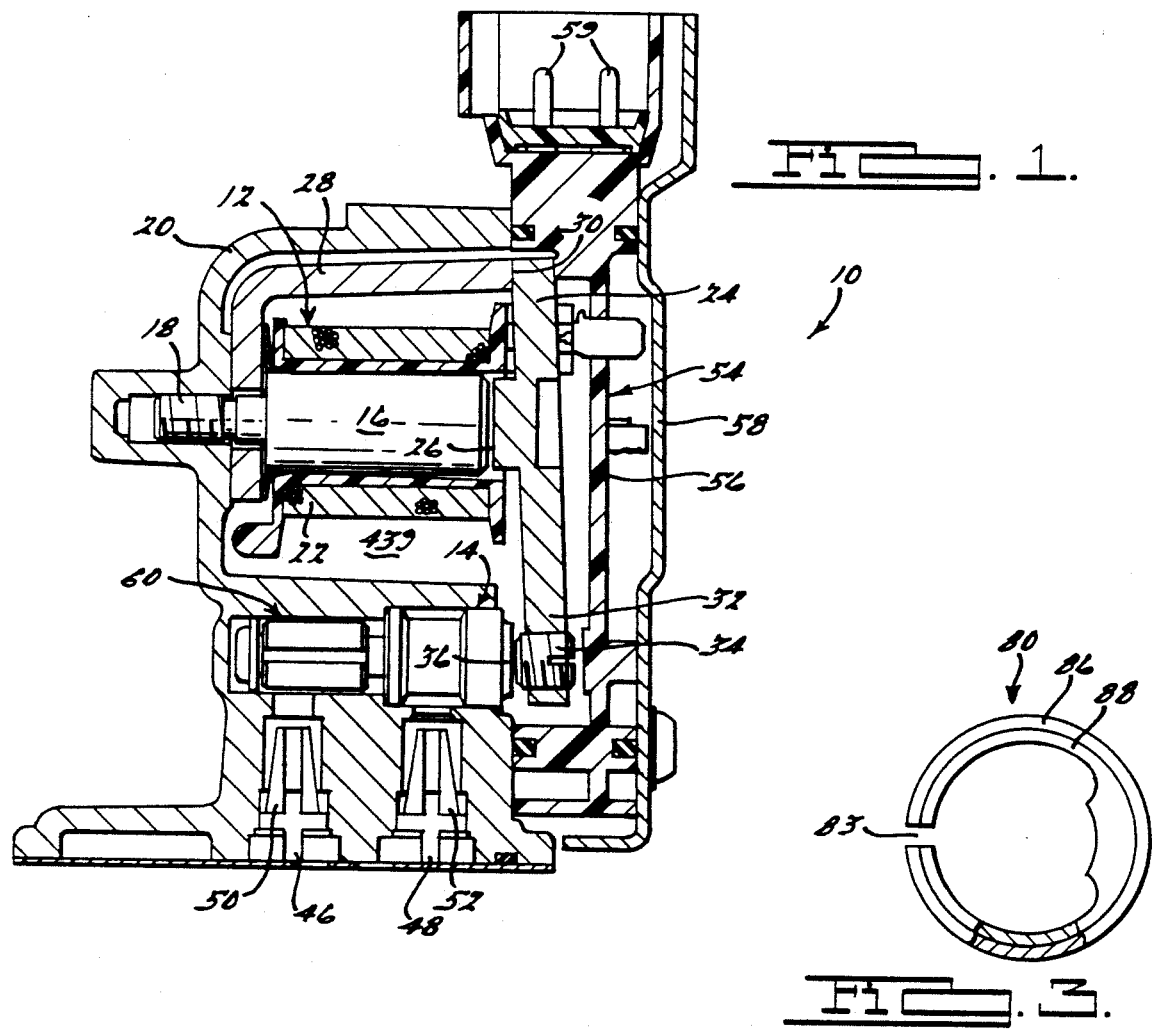
FIG. 1.
FIG. 3.
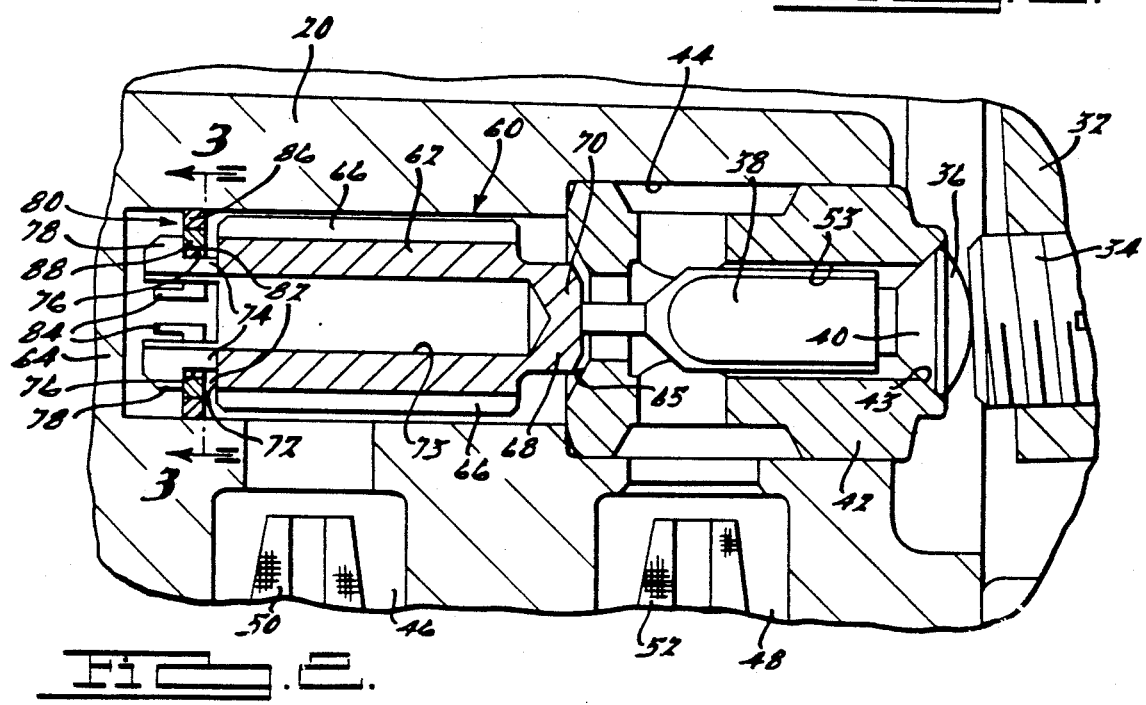
FIG. 2.

4,949,752

THERMALLY COMPENSATED NOISE CONTROL DEVICE FOR A SOLENOID-ACTUATED VALVE

BACKGROUND OF THE INVENTION

1. Field of the Invention

The present invention relates generally to an automatic transmission primarily intended for motor vehicle use, and more particularly to, a noise control device for a solenoid-actuated valve in or connected to a transmission that is controlled electronically and hydraulically.

2. Description of Related Art

In an automatic transmission, hydraulic controls such as valves are used for applying and releasing elements to shift the gears of the transmission. The control system of the automatic transmission includes electrically operated solenoid-actuated valves for controlling certain fluid pressures. This hydraulic pressure control will cause either the actuation or deactuation of the respective applying and releasing elements for effecting gear changes in the transmission.

An example of a previous noise control device for a solenoid-actuated valve is disclosed in copending patent application, U.S. Ser. No. 188,618, filed Apr. 29, 1988, entitled "Noise Control Device for a Solenoid-Actuated Valve", which is hereby incorporated by reference. This device provided a spool slideably disposed in a passageway and having an axially projecting portion which contacts a ball of a valve. A spring is disposed in the passageway and biases the spool toward the ball such that it contacts its normal, deactivated seat. The spool also includes lands which allow only gradual flow of fluid past the spool to reduce or slow its pull in velocity and thus reduce impact noise between the ball and its active, energized seat.

3. Objects of the Present Invention

It is one of the principle objects of the present invention to provide a noise control device for a solenoid-actuated valve of an automatic transmission which is controlled electronically and hydraulically.

It is a more specific object of the present invention to provide a thermally compensated noise control device for a solenoid-actuated valve which reduces impact noise upon actuation of the solenoid-actuated valve.

SUMMARY OF THE INVENTION

To achieve the foregoing objects, the present invention provides a thermally compensated noise control device for a solenoid-actuated valve. The present invention is a thermally expanding ring which varies the amount of clearance between the device and the passageway to control fluid flow past the device. The present invention provides high pull-in dampening and low return dampening, both of which can be calibrated independently. The present invention also provides improved durability of mating surfaces between the valve seat and plunger. The present invention further provides greater dirt tolerance and higher pull-in dampening when hot and lower pull-in dampening when cold. The present invention does not affect the pull-in or hold in force (current). The present invention also eliminates damping at the start of the pull-in stroke.

Other objects, features and advantages of the present invention will become more fully apparent from the following detailed description of the preferred embodiment, the appended claims and in the accompanying drawings.

BRIEF DESCRIPTION OF THE DRAWINGS

FIG. 1 is a sectional elevational view of a solenoid-actuated valve having constructed noise control device in accordance with the principles of the present invention.

FIG. 2 is an enlarged view of a portion of the solenoid-actuated valve and the noise control device shown in FIG. 1.

FIG. 3 is a sectional view of a ring of the noise control device taken along line 3—3 of FIG. 2.

DESCRIPTION OF THE PREFERRED EMBODIMENT

Referring to FIG. 1, a direct-acting, solenoid-actuated valve 10 is shown. The solenoid-actuated valve 10 directly controls fluid flow to a clutch assembly (not shown). The solenoid-actuated valve 10 is of the type commonly referred to as normally vented. The solenoid-actuated valve 10 includes a solenoid assembly, generally indicated at 12, and a valve assembly, generally indicated at 14. The solenoid assembly 12 includes a stationary core member 16 having an outer cylindrical shape. A threaded portion 18 extends from one end of the core member 16 and is threadably engageable with a housing 20. An electrical coil 22 is disposed coaxially around the core member 16. A moveable member or armature 24 is spaced axially from the core member 16 to form a working air gap 26 therebetween. An L-shaped magnetic shunt member 28 is secured between the core member 16 and the housing 20. One edge 30 of the shunt member 28 contacts or abuts the armature 24 to allow the armature 24 to pivot or hinge about that line while effectively transmitting the magnetic flux through the armature 24 and shunt member 28. One end 32 of the armature 24 has an adjustment screw 34 threadably engaged and, in turn, capable of contacting a spherical end 36 of a valve plunger 38, (FIG. 2) so that the valve plunger 38 will reciprocate in response to appropriate magnetically induced actuations of the armature 24.

The valve plunger 38 is formed with a conical portion 40 which, when the solenoid assembly 12 is energized, it is shown to be in sealing engagement with a valve insert 42, thereby closing a vent port 43 leading to the vent reservoir 43a. The valve insert 42 is disposed in a passageway 44 which communicates between an inlet or supply port 46 and a clutch or element port 48 leading to a clutch apply cavity (not shown). Filters or screens 50 and 52 are disposed in the supply port 46 and clutch port 48, respectfully, to filter or trap large debris (such as machining chips) and prevent its distribution through the hydraulic system where it could cause malfunction. The valve plunger 38 is coaxially disposed within a central passage 53 formed in the valve insert 42 which communicates with the passageway 44, vent port 43 and the clutch port 48.

Additionally, a circuit and switch assembly, generally indicated at 54, includes an insulative circuit 56 disposed between a cover member 58 and the housing 20. A male plug member 59 is connected to the circuit 56 for attachment to an external source of electrical power such as a transmission controller (not shown).

Referring to FIGS. 1 and 2, the present invention comprises a noise control device or damper assembly, generally indicated at 60. The noise control device 60 includes a moveable damper 62 disposed in the passageway 44 between a localized, non-sealing travel stop 64 and a conical seat 65 formed at one end of the valve insert 42. The damper 62 allows an open flow path past it during actuation or operation. The damper 62 is generally an elongated cylinder having a plurality of axially and radially extending ribs 66 which loosely pilot and center the damper 62 in the passageway 44 while permitting coaxial flow from the supply port 46 to the valve insert 42. It should be appreciated that the ribs 66 could be helical to prevent grooves from being formed in the housing 20 due to wear.

The damper 62 has a first end 68 which is flat or planar to reduce contact stress on the mating valve plunger 36. The first end 68 has an axially extending male projection and conical seat 70 which produces lower contact stress on the seat 65 of the valve insert 42 than a conventional ball. The damper 62 also has a second end 72 axially spaced from the first end 68 which has a cavity 73 extending axially into the damper 62. The second end 72 also includes a plurality of axially extending tabs 74. The tabs 74 are generally "flag-shaped" and include a notch 76 between the second end 72 and an enlarged portion 78 of the tab 74.

Referring to FIGS. 2 and 3, the device 60 includes a generally annular ring, generally indicated at 80, slightly thinner than the width of the notches 76 such that an annular first gap 82 exists axially between the ring 80 and the second end 72 of the damper 62. On the return stroke, the first gap 82 permits free fluid flow from the supply port 46 to the second end 72 of the damper 62, in turn, permitting relatively undamped return stroke as the damper 62 moves toward the valve insert 42. The first gap 82 will remain as shown in the figures when the damper 62 seats on the valve insert 42. The ring 80 is not continuous and forms a second gap 83 which facilitates assembly and provides for calibration. The ring 80 includes a pair of radially inwardly and axially outwardly extending flanges 84. The flanges 84 resist the second gap 83 from being aligned with the ribs 66 or tabs 74. The ring 80 is a relatively high thermal expansion material such that, at room temperature assembly, it fits freely in the passageway 44. When the ring 80 is heated (e.g. hot) only the second gap 83 allows pull-in flow. When the ring 80 is cold, the outer diameter clearance minimizes damping.

The ring 80 may be only a wear resistant, high thermal expansion material. However, the ring 80 may be further enhanced by use of non-homogeneous construction such that a higher expansion rate exists at the inner diameter versus the outer diameter, such as a bi-metal. As shown in FIG. 3, an outer portion 86 would be a lower expansion rate material than an inner portion 88, such that the free diameter would change with temperature.

At room temperature, pull-in dampening is relatively low due to radial clearance between the ring 80 and the passageway 44. However, within increased pull-in velocity, the pressure generated in the passageway 44 will tend to expand the ring 80 to match the diameter or bore size of the passageway 44, after which the damping rate is determined by the second gap 83. Then, with further thermal expansion of the ring 80, the second gap 83 will decrease as temperature rises, thus providing desired stronger damping effect. At very cold temperatures, a large radial clearance will exist between the ring 80 and the passageway 44 such that negligible damping will exist and pressure expansion of the ring 80 will not occur.

In operation, the solenoid-actuated valve 10 is normally vented when not energized (i.e. no current flows through the windings of the coil 22). As a result, fluid enters the supply port 46 and flows through the passageway 44, causing the damper 60 to move and engage the seat 65 of the valve insert 42. The damper 60 on its seat 65 blocks fluid flow from the supply port 46, preventing fluid from entering the clutch port 48. The displacement of the damper 60 moves the valve plunger 38, causing the conical portion 40 to be disengaged or moved off the valve insert 42. As a result, fluid from the clutch port 48 flows through the central passage 53 along the plunger 38 and between the conical portion 40 and valve insert 42, venting through the vent port 43 to the vent reservoir 43a. Hence, the solenoid-actuated valve 10 and its related clutch assembly are normally vented.

When the solenoid-actuated valve 10 is actuated, as shown in FIG. 1, current flows through the coil 22 and creates a magnetic flux loop through the armature 24, core member 16 and shunt member 28. This magnetic flux causes a magnetic attraction between the armature 24, shunt member 28 and the core member 16. This causes the armature 24 to move toward and contact the edge 30 of the shunt member 28 to reduce the working air gap 26, but not contact the core member 16. The armature 24 pivots about the edge 30 of the shunt member 28 and displaces the valve plunger 38, and in turn, displaces the damper 60 off the seat 65 to allow fluid to flow from the supply port 46 past the damper 60 by way of passage 44 through the valve insert 42 to the clutch port 48. As the damper 60 moves away from the valve insert 42, the first gap 82 closes (shifts to the other side of the ring 80 between the ring 80 and enlarged portion 78 of the tabs 74) and high damping is initiated, except when cold.

The present invention provides several advantages among which is that the tolerance to dirt is anticipated due to moderate clearance allowances, the ribs 66 being parallel to flow direction and characteristics of the ring 80 which include wiping action and radial thermal cycling motion. Since no spring load is used, there is no change to the pull-in or hold-in forces compared to an undamped system.

The present invention has been described in an illustrative manner. It is to be understood that the terminology which has been used is intended to be in the nature of words of description rather than of limitation.

Obviously, many modifications and variations of the present invention are possible in light of the above teachings. Therefore, within the scope of the appended claims, the present invention may be practiced otherwise than as specifically described.

What is claimed is:

1. A valve assembly for controlling fluid flow between a fluid supply source and fluid actuating device in a vehicle transmission, said assembly comprising:
    a housing having a supply port for connection with the fluid supply source, an element port for connection with the fluid actuating device, and a passageway communicating with said supply port and said element port;
    a valve disposed within said passageway and moveable between positions which cause the element port to be either connected to said supply port or a vent port;

a valve seat means forming at least one valve seat in said passageway and having a central passage communicating therethrough;

electromagnetic means for producing a magnetic field when electrically energized;

a plunger operatively connected to said electromagnetic means having a longitudinal axis aligned with said central passageway to move said valve and act in conjunction with said valve and said valve seat means to effect the element connection to either said supply or vent port;

a damper slideably disposed within said passageway; and said damper including means for expanding and contracting in response to the temperature of the fluid to allow gradual flow of fluid within said passageway to slow the velocity of said valve and reduce impact noise between said valve and at least one of said valve seat means and said housing.

2. An assembly as set forth in claim 1 wherein said valve includes first and second axially spaced ends.

3. An assembly as set forth in claim 2 wherein said damper has at least one axially extending rib with a diameter less than the diameter of said passageway to allow gradual flow of fluid past said land.

4. An assembly as set forth in claim 3 wherein said damper has a male projection extending axially from said first end toward said valve seat means.

5. A valve assembly for controlling fluid flow between a fluid supply source and fluid actuating device in a vehicle transmission, said assembly comprising:

a housing having a supply port for connection with the fluid supply source, an element port for connection with the fluid actuating device, and a passageway communicating with said supply port and said element port;

a valve disposed within said passageway and moveable between positions which cause the element port to be either connected to said supply port or a vent port;

a valve seat means forming at least one valve seat in said passageway and having a central passage communicating therethrough;

electromagnetic means for producing a magnetic field when electrically energized;

a plunger operatively connected to said electromagnetic means having a longitudinal axis aligned with said central passageway to move said valve and act in conjunction with said valve and said valve seat means to effect the element connection to either said supply or vent port;

said valve including means for expanding and contracting in response to the temperature of the fluid to allow gradual flow of fluid within said passageway to slow the velocity of said valve and reduce impact noise between said valve and at least one of said valve seat means and said housing;

said means comprising a damper slideably disposed within said passageway and having first and second axially spaced ends;

said damper having at least one axially extending rib with a diameter less than the diameter of said passageway to allow gradual flow of fluid past said land;

said damper having a male projection extending axially from said first end toward said valve seat means; and said damper including tab means forming at least one tab extending axially away from said valve seat means at said second end and having a notch therein.

6. An assembly as set forth in claim 5 wherein said means comprises a ring disposed in said notch.

7. An assembly as set forth in claim 6 wherein said notch has a width greater than said ring to form a first gap between either one of said ring and said tab and said end of said damper.

8. An assembly as set forth in claim 7 wherein said ring is annular and discontinuous to form a second gap between the ends thereof.

9. An assembly as set forth in claim 8 wherein said ring has an outer portion and an inner portion, said inner and outer portions being made of dissimilar materials.

10. An assembly as set forth in claim 9 wherein said damper includes means forming a cavity extending axially inwardly at the said second end of said damper.

11. An assembly as set forth in claim 10 wherein said male projection includes a conical portion for mating with said valve seat means.

12. An assembly as set forth in claim 11 further characterized by said electromagnetic means comprising a core member secured to said housing, and an electrical coil disposed about said core member.

13. An assembly as set forth in claim 12 wherein said armature means comprises an armature member axially spaced from said core member to form a working air gap therebetween.

14. An assembly as set forth in claim 13 including a shunt member disposed between said core member and said housing and contacting said armature member at one edge thereof to allow said armature member to pivot about said edge thereof.

15. An assembly as set forth in claim 14 characterized by said plunger means comprising a plunger member having a shaft at one end to contact said damper and a head portion at the other end to contact said armature member.

16. An assembly as set forth in claim 15 including circuit means for receiving electrical current from an electrical supply source.

17. An assembly as set forth in claim 16 wherein said valve seat means comprises a valve insert disposed in said passageway and having at least one valve seat.

18. An assembly as set forth in claim 17 further characterized by said head portion having a conical portion to contact said valve insert when said plunger member is moved in response to said electromagnetic means being electrically energized to form a seal capable of preventing fluid flow from venting therethrough.

19. An assembly as set forth in claim 18 wherein said plunger member includes a plurality of flutes circumferentially spaced thereabout to maintain alignment of said plunger member in said central passage of said valve insert while allowing fluid flow along said flutes through said central passage.

20. A valve assembly for controlling fluid flow between a fluid supply source and fluid actuating device in a vehicle transmission, said assembly comprising:

a housing having a supply port for connection with the fluid supply source, an element port for connection with the fluid actuating device, and a passageway communicating with said supply port and said element port;

an insert disposed in said passageway and having at least one seat and a central passage communicating therethrough;

a damper disposed within said passageway and moveable between positions which cause the element port to be either connected to said supply port or a vent port;

a plunger having a longitudinal axis aligned with said center of said damper to move said damper and act in conjunction with said damper and said valve seat to effect the element connection to either said supply or vent;

electromagnetic means for producing a magnetic field when electrically energized;

armature means moveable in response to the presence and absence of a magnetic field for actuating said plunger;

said damper having at least one axially extending land with a diameter less than the diameter of said passageway to allow gradual flow of fluid past said land;

said damper including tab means forming at least one tab extending axially and having a notch therein; and means disposed in said notch for expanding and contracting in response to the temperature of the fluid for varying the flow of fluid within said passageway and reducing impact noise.

* * * * *